(12) United States Patent
Kodama

(10) Patent No.: US 6,292,326 B1
(45) Date of Patent: Sep. 18, 2001

(54) DISK DEVICE AND REMOVABLE MAGNETIC DISK DEVICE WITH ELECTRICALLY SEPARATED CIRCUIT PORTIONS FOR IMPROVED ELECTRO-MAGNETIC COMPATIBILITY

(75) Inventor: Koji Kodama, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/536,448

(22) Filed: Mar. 28, 2000

Related U.S. Application Data

(62) Division of application No. 09/136,684, filed on Aug. 19, 1998, now Pat. No. 6,078,465.

(30) Foreign Application Priority Data

Aug. 25, 1997 (JP) .................................................. 9-228355

(51) Int. Cl.⁷ .................................................. G11B 17/00
(52) U.S. Cl. .......................................................... 360/97.01
(58) Field of Search ............................. 360/77.03, 77.02, 360/75, 77.04, 77.07, 97.02, 123, 97.01

(56) References Cited

U.S. PATENT DOCUMENTS

| | | | |
|---|---|---|---|
| 4,396,959 | * 8/1983 | Harrison et al. | 360/77.3 |
| 4,419,701 | * 12/1983 | Harrison et al. | 360/77.02 |
| 4,660,106 | * 4/1987 | Harrison et al. | 360/75 |
| 4,814,909 | * 3/1989 | Brown et al. | 360/77.04 |
| 4,872,074 | * 10/1989 | Brown et al. | 360/77.07 |
| 4,920,434 | * 4/1990 | Brown et al. | 360/77.03 |
| 4,982,296 | * 1/1991 | Brown et al. | 360/77.03 |
| 5,142,425 | * 8/1992 | Gailbreath, Jr. et al. | 360/97.02 |
| 5,777,829 | * 7/1998 | Voldman et al. | 360/123 |
| 5,936,798 | 8/1999 | Johnson et al. | |
| 5,966,267 | 10/1999 | Hooley et al. | |

FOREIGN PATENT DOCUMENTS

| | | |
|---|---|---|
| 60-83287 | 5/1985 | (JP) . |
| 61-175991 | 8/1986 | (JP) . |
| 4-356785 | 12/1992 | (JP) . |
| 5-181565 | 7/1993 | (JP) . |
| 7-58501 | 3/1995 | (JP) . |
| 1-299091 | 12/1999 | (JP) . |

OTHER PUBLICATIONS

"International Standard—Electromagnetic Compatibility for Industrial–Process Measurement and Control Equipment", IEC 801–2, 1994–04, pp. 7–9, 15–17 and 25–28.
Maxim Publication, "Analog Design Guide", 9th Edition.

* cited by examiner

*Primary Examiner*—Allen T. Cao
(74) *Attorney, Agent, or Firm*—Mattingly, Stanger & Malur, P.C.

(57) ABSTRACT

The electric circuit 108 is electrically separated into two portions, a first electric circuit portion 109 and a second electric circuit portion 110 which processes a small analog signal. The ground 126 of the first electric circuit portion can be connected to the ground 125 of the host unit. The ground and power supply lines of the amplifier 107 in the assembly 102 are connected directly to those of the second electric circuit portion, respectively. An optical data and signals transmitting/receiving member, such as a photocoupler 114, transmits and receives data and signals between the first electric circuit portion and the second electric circuit portion and is provided between both these portions. An enclosure 101 encloses and shields electro-magnetically the whole device with an electric conductor. A conductive connecting member 123 is provided between the electric conductor of the enclosure and the ground 124 of the host unit.

11 Claims, 3 Drawing Sheets

DISK DEVICE AND REMOVABLE MAGNETIC DISK DEVICE WITH ELECTRICALLY SEPARATED CIRCUIT PORTIONS FOR IMPROVED ELECTRO-MAGNETIC COMPATIBILITY

This is a divisional application of U.S. Ser. No. 09/136,684, filed Aug. 19, 1998 U.S. Pat. No 6,078,465.

FIELD OF THE INVENTION

This invention relates to an improvement of a disk device, such as a magnetic disk device, an optical disk device and a removable magnetic disk device, etc.

BACKGROUND OF THE INVENTION

The down-sizing of computers, especially of personal computers (hereinafter referred to as PCs), has been in progress for some time. For example, they have been down-sized from desk-top type to lap-top type, to note-book type and further to memo-book type. This has been accompanied by the down-sizing of magnetic disk devices used in PCs. For example, from 3.5 inch to 2.5 inch to 1.8 inch and further to 1.3 inch. This down-sizing trend is similar in optical disk devices as in magnetic disk devices. Hereinafter, magnetic disk devices, and optical disk devices, etc. will be generically referred to as disk devices.

Mechanical connecting/disconnecting technology and assembling technology of a detachable type disk device called card-type has appeared along with the down-sizing of disk devices and is disclosed in Japanese patent unexamined publication 5-181565 or 4-356785. The typical standard including electrical connecting interface was established in cooperation of Japan Electronic Industry Association (JEIDA) and US Personal Computer Memory Card International Association (PCMCIA) and is the standard specification for IC memory-card. Initially this standard was not intended for disk devices, but has been expanded to include disk devices during the course of down-sizing. This portable small disk device is connected to the memory-card slot of a PC directly, or indirectly through a connecting cable, and is sometimes operated in a partially or entirely exposed state. Therefore, it is important that radiation noise from the device should not exceed the standard, and to prevent damage or performance deterioration from electro-static discharge.

Furthermore, recently, Electro-Magnetic Compatibility (EMC), which relates to a device or system's capability to function satisfactorily without electro-magnetically affecting other surrounding devices, has more frequently been required for devices including information processing devices. For example, an electric device is allowed to be in the market in Europe from Jan. 1, 1996 only when it satisfies the EMC Standard and the CE-mark is indicated on it, according to EU EMC order/336. This kind of EMC control has been a world-wide trend and not limited only to the EU.

The Electrostatic Discharge (ESD) test is included in the above mentioned EMC control items. According to the international standard IEC 801-2(1991-04), due to the variation in devices and systems, it is difficult to evaluate and determine the influences of ESD by a general standard. Thus, test results are classified according to the following performance evaluation items in accordance with operating conditions and functional specifications of the tested devices.

1. Normal operation within the limit of specifications.
2. Temporary and self-recoverable deterioration or loss of function or operation.
3. Temporary deterioration or loss of function and operation, which is recovered by operator or system-reset.
4. Un-recoverable deterioration or loss of function by damage of a device or a software, or by loss of data.

There are three test conditions, a contact discharge test, an air discharge test (both of which are direct discharge tests), and an in-direct discharge test. Discharge voltages include 2, 4, 6, 8, and 15 kV.

The built-in type of small magnetic disk devices (Hard Disk Drives) which are generally to be assembled to be used in a PC etc., do not have operational functions and enclosing cases independently. Since it is difficult to evaluate the above mentioned three items for such devices, it has been authorized by the international authorization organization TUV that, after direct discharge to the handling portions and in-direct discharge to neighborhood portions of an in-active small magnetic disk device, the device is installed in a PC and operated and the above mentioned item 4 is tested. The test results are used as a part of judgment whether the device conforms to the EMC control.

However, a PC in which a small magnetic disk device is installed has to be tested with the above mentioned Electrostatic Discharge (ESD) test for items 1, 2, 3 in an active state. Further there is an operating environment that the portable small disk device itself has to be operated in an exposed condition partly or entirely. Therefore, it is necessary for the small magnetic disk device itself to obtain higher durability to Electrostatic Discharge in an active state.

Prior art countermeasures for electrostatic discharge related to portable data recording devices are disclosed in patent unexamined publications JP 60-83287 and JP 7-58501. In these prior art, technologies to obtain higher durability to electrostatic discharge in in-active state are stated, but not in active state.

In the case of active state, technologies to obtain higher durability to electrostatic discharge, are disclosed in patent unexamined publications JP 61-175991 and JP 1-299091, but are not especially effective for disk devices.

Moreover, apart from the field of portable data recording devices, in the field of data transmission, it is known to obtain higher durability to electrostatic discharge by separating an electric circuit using optical coupling means. An example of integrated circuits for separating electric circuit using optical coupling, is MAX1490A made by Maxim Integrated Products, Inc. This IC contains a bi-directional data transmitter with optical coupling and a power transmitter including a transformer and a DC to DC converter and a separation of 500 Vrms is achieved.

Here, for an example, according to IEC801-2, durability to electrostatic discharge required for small magnetic disk devices in active state is 4 kv in contact discharge test and 8 kV in in-air discharge test. Thus, a conventional magnetic disk device shown in FIG. 3 is examined. The conventional magnetic disk device includes mainly a head disk assembly (HDA) 202 in disk drive enclosure 201 and a printed circuit board (PCB) 208 having mainly electric circuits. The HDA 202 includes magnetic disks 203, magnetic heads 204, a spindle motor 205, read/write pre-amplifier 207 and a head actuator (include voice-coil motor (VCM) 206) as a head positioning mechanism.

The PCB 208 is an electric circuit that is provided with a connector 211 through which data and signals are transmitted and received to and from the host unit (not shown) and through which power is supplied. The PCB 208 controls the HDA 202 by transmitting and receiving said data and signals and supplying the power through said connector and processes data and signals between said host unit and the HDA 202. The PCB 208 includes in addition to the connector 211 for connecting with the host unit (not shown), ferrite beads 220, 223, an interface drive controller 212, a read/write channel 215, a micro-processor 216, and a spindle motor-VCM drive circuit 219. Here, 225 is the ground of the host unit, 233 is an interface line to the host unit, 229 is a DC 5V power supply line of the host unit, 226 is a PCB ground, 227 is a DC 5V power supply line for HDA 202 passed through ferrite beads 220, 228 is a HDA ground, 232 is a DC 5V power line for PCB 108 passed through ferrite beads 223, and 238 is bus line.

As shown in FIG. 3, in conventional ordinary magnetic disk device, digital circuits including interface line 233 to the host unit, system control circuit with microprocessor 216, and digital positioning servo control circuit, are mixed with analog circuits including data read circuit from disk 203 and rotating speed detecting circuit for spindle motor 205.

The digital circuit has higher anti-noise durability than an analog circuit, since the digital circuit utilizes a binary saturated level signal with relatively large amplitude. An input signal to the digital circuit is discriminated as high or low by comparing it with a threshold level. Error timing in the digital circuit is limited to the rise/fall timing of a clock pulse.

In contrast to this, the analog circuit, especially a data-read circuit has very low anti-noise durability. For example, a very small analog signal of about 0.5 mvpp amplitude is reproduced from the head 204 in this data-read circuit, and the small signal is amplified to about 100 mvpp at a pre-amplifier 207 and is finally amplified to 500 mvpp to 1 Vpp with a total gain 60 dB. Then the amplified signal is transformed into a pulse and digitized. Therefore, there is a problem that, when a comparatively small noise arises on the signal line, the ground 225, 226, 228, or power line 227, 229 by inductive, capacitive, or conductive coupling with electro-static discharge (ESD) during a data read operation, such noise is added to reproduced signal from the head 204 and becomes large due to amplification. This in turn can cause data error, hang-up of device operation, and sometimes circuit breakdown.

Since, it is similar in optical disk device as in magnetic disk device that very small analog signal of less than a few mV amplitude is reproduced from transducer, there is a problem also in optical disk device that electro-static discharge(ESD) during a data read operation sometimes causes data error, hang-up of device operation, or circuit breakdown.

SUMMARY OF THE INVENTION

An object of the present invention is to provide the disk device and removable magnetic disk device which keeps superior Electro-Magnetic Compatibility (EMC) and high durability against noise which is induced by electro-static discharge (ESD) not only in an in-active state but also in an active state of operation, and does not cause data error, hang-up of device operation, or circuit breakdown.

In order to achieve this object, the present invention provides a disk device, which includes a transducer-disk assembly, an electric circuit that is provided with a connector/interface through which data and signals are transmitted and received to and from a host unit and through which power is supplied, controls said transducer-disk assembly with transmitting and receiving data and signals and with supplying the power through the connector, and processes data and signals between the host unit and transducer-disk assembly, and an enclosure that encloses and electro-magnetically shields said transducer-disk assembly and the electric circuit, and is made from electrically conductive material, wherein, the electric circuit is divided and separated electrically into two portions, that is, a second electric circuit portion where a small analog signal is transmitted, and a first electric circuit portion that contains said connector and the rest of the electric circuit excluding the second electric circuit portion, the ground of the first electric circuit portion can be connected to the ground of the host unit, the ground and power supply line of the amplifier of the transducer-disk assembly are connected to those of the second electric circuit portion respectively, optical data and signals transmitting/receiving means which transmits and receives data and signals between the first electric circuit portion and the second electric circuit portion is provided between both portions, and conductive connecting means is provided between the electric conductor of the enclosure and the ground of the host unit.

When, in a disk device, the electric circuit is separated electrically as described above, the ground of the first electric circuit portion can be connected to the ground of the host unit through the connector, the ground and power supply line of the amplifier are connected to those of the second electric circuit portion respectively, the transmitting and receiving of data and signals between the first and second electric circuit portion is made by optical coupling means, and the electrical conductor of the enclosure can be connected to the ground of the host unit.

Thus, it is made possible that the second electric circuit portion and the transducer disk assembly are separated electrically from the first electric circuit portion and the host unit, and transmitting and receiving of data and signals is made between both portions. This way, Electro-Magnetic Compatibility (EMC) can be improved, higher durability to the noise induced by the electro-static discharge (ESD) can be obtained not only in an inactive state but also in an active state of operation, and read data error, hang-up of device operation, and circuit break-down can be prevented.

Furthermore, to achieve the object of the present invention provides a removable magnetic disk device, which includes a head-disk assembly, an electric circuit that is provided with a connector through which data and signals are transmitted and received to and from the host unit and the power is supplied, controls said head-disk assembly with transmitting and receiving said data and signals and with supplying the power through said connector, and processes data and signals between said host unit and head-disk assembly, and an enclosure that encloses and electro-magnetically shields the head disk assembly and electric circuit, and is made from electrically conductive material, characterized in that:

the electric circuit is divided and separated electrically into two portions, that is, a second electric circuit portion where small analog signal is transmitted, and a first electric circuit portion that contains said connector and electric circuit excluding the second electric circuit portion, the ground of the first electric circuit portion can be connected to ground of the host unit, the ground and power supply line of the amplifier of the transducer-disk assembly are connected directly to those of the second electric circuit portion respectively, optical data and signals transmitting/receiving means which transmits and receives data and signals between the first electric circuit portion and the second electric circuit portion is provided between both portions, conductive connecting means is provided between the electric conductor of the enclosure and the ground of the host unit, power supplying means from the first electric circuit portion to the second electric circuit portion in the state that both electric circuit portions are separated electrically from each other, a series circuit of inductance and resistor is provided between the ground of the first electric circuit portion and the ground of the second electric circuit portion, electrically insulating means having a spark voltage durability over 4 kV are provided between the electric conductor of the enclosure and both the first and second electric circuit portions, and switches which are provided between each input pin of the connector and the ground of the first electric circuit portion and are closed or opened in accordance with disconnecting or connecting of the enclosure to the host unit.

When, in a removable magnetic disk device, an electric circuit is separated electrically as described above, the ground of the first electric circuit portion can be connected to the ground of the host unit through the connector, the ground and power supply fine of the amplifier are connected directly to those of the second electric circuit portion respectively, transmitting and receiving of data and signals between the first and second electric circuit portion is made by optical coupling means, and the electrical conductor of the enclosure can be connected to the ground of the host unit, it is made possible that the second electric circuit portion and the transducer disk assembly are separated electrically from first electric circuit portion and the host unit, and transmitting and receiving of data and signals is made between the both portions. Hereby, Electro-Magnetic Compatibility (EMC) can be improved, higher durability to the noise induced by the electrostatic discharge (ESD) can be obtained not only in an in-active state but also in an active state of operation, and read data error, hang-up of device operation, and circuit break-down can be prevented.

Especially, by providing the power supply means as described above, it is made possible that power is also supplied in the state that both electric circuit portions are separated electrically from each other and the affect of the noise induced through the power supply line can be prevented.

Through the series circuit of inductance and resistor, it is made possible that charge on the second electric circuit portion is discharged to the first electric circuit portion with relatively slow rate. Hereby, it is prevented that charge stored excessively on the second electric circuit portion is discharged to the first electric circuit portion, so that the damage of the device or harmful effect to the device operation is avoided. Especially, since a high frequency component is suppressed by the inductance, it is prevented that noise generated in digital circuit of the first electric circuit portion affects small analog signal (reproduced signal) in the second electric circuit portion. Here, the amplifier in the head disk assembly, whose power supply and ground are connected to those of the second electric circuit portion, is considered to be contained in the second electric circuit portion. Therefore it is prevented also that the noise from the digital circuit in the first electric circuit portion affects the very small analog signal (reproduced signal) from the amplifier.

Furthermore, the EMC standard for small magnetic disk device is satisfied by providing the insulating means. Also, by providing the switch, when the enclosure is not connected to the host unit, the switch is closed and input pins of the connector is connected to the ground, so that the internal circuit is prevented from breakdown caused by electrostatic discharge to the input pin of the connector.

These and other objects, features and advantages of the present invention will become more apparent in view of the following detailed description of the present invention in conjunction with the drawings.

DETAILED DESCRIPTION OF THE PREFERRED EMBODIMENTS

An embodiment of the present invention will now be described in conjunction with the Figures.

Figure 1:
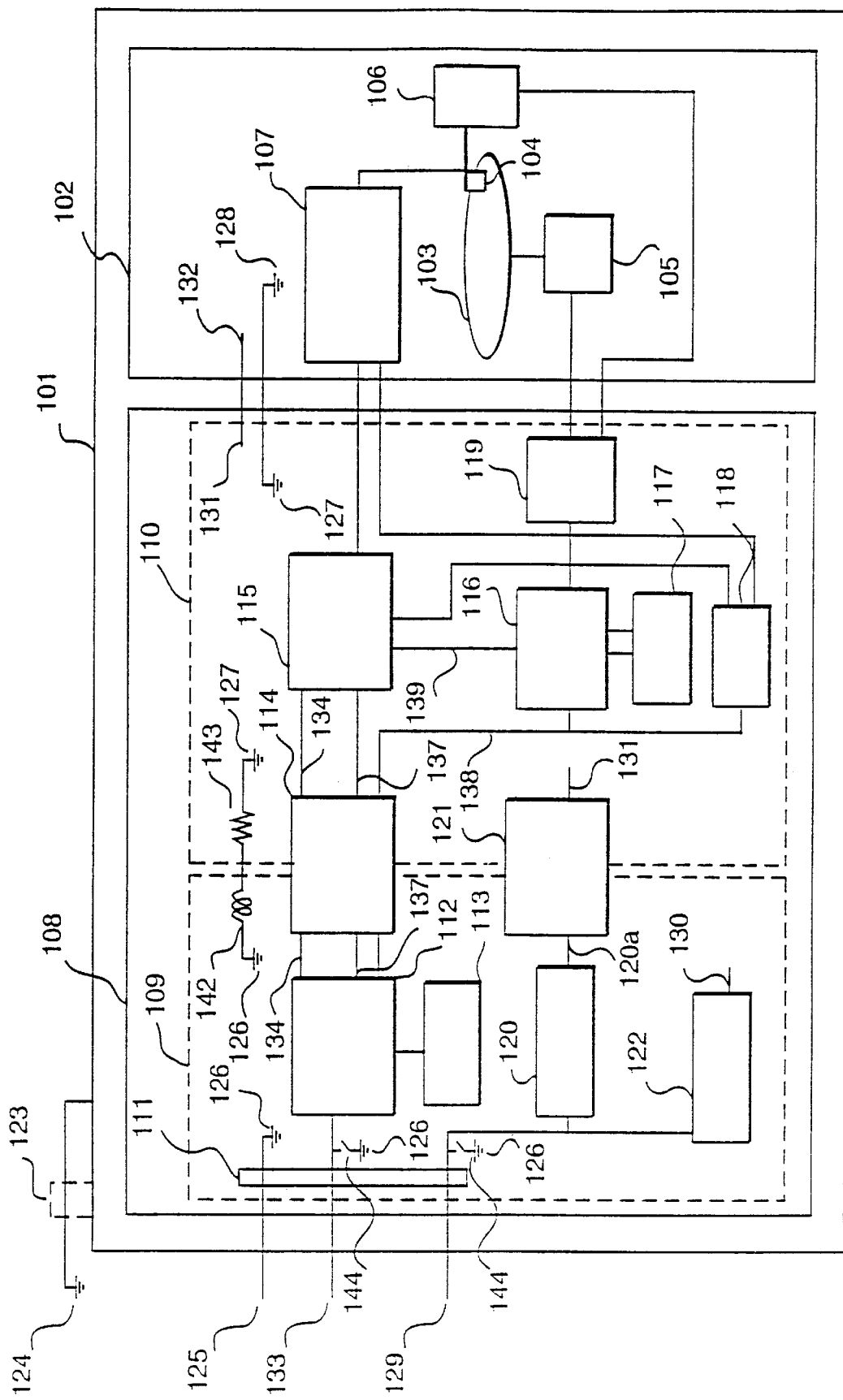
FIG. 1 is a block diagram of the magnetic disk device according to an embodiment of the present invention.
Figure 2:
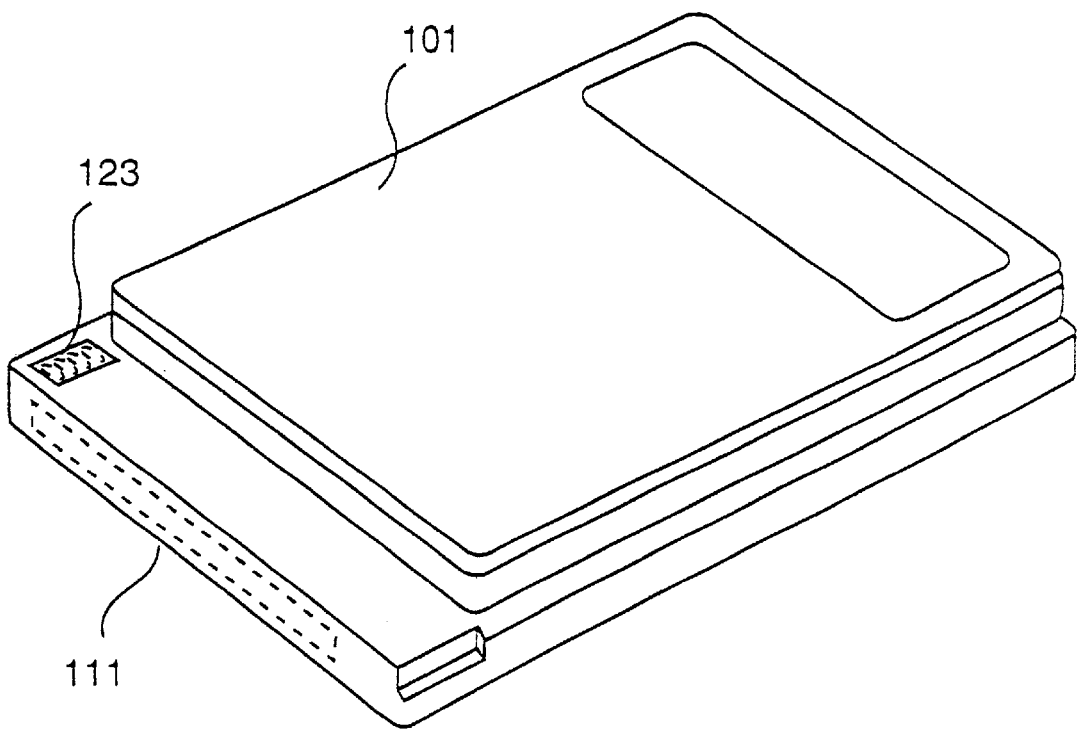
FIG. 2 is a oblique view of the PCMCIA card type removable magnetic disk device according to the embodiment of the present invention shown in FIG. 1.
Figure 3:
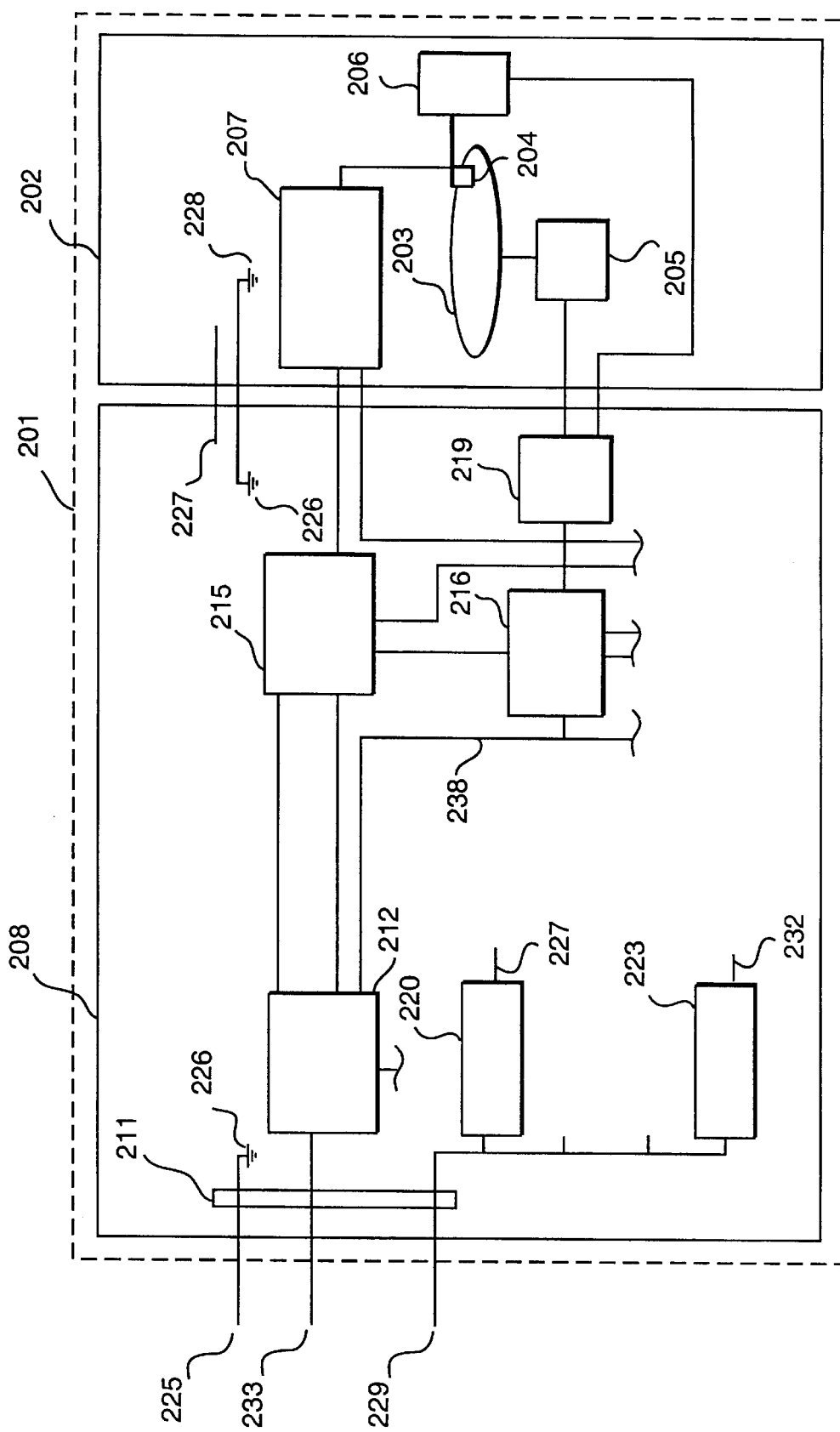
FIG. 3 is a block diagram of a conventional disk device.

FIG. 1 shows an example of magnetic disk device which is an embodiment of the present invention. FIG. 2 is an oblique view showing an example of PCMCIA-card type removable magnetic disk device to which the present invention is applied.

As shown in FIG. 1, the disk device (magnetic disk device) according to the present invention includes a head-disk assembly (HDA) 102 in a disk drive enclosure 101 and a portion excluding the HDA 102, that is, a printed circuit board (PCB) 108 carrying mainly an electric circuit.

The HDA 102 includes a magnetic disk 103 which is a diskform recording medium, a spindle motor which rotates the disk 103, a magnetic head 104 which records and reproduces data by electromagnetic transformation to and from the disk 103, a head actuator (includes voice coil motor (VCM) 106) which is a head positioning mechanism which positions the head 104 to an appointed position (track) on the disk 103, and a read/write preamplifier 107, etc.

The PCB 108 is an electric circuit that is provided with a connector 111 (or interface, capable of infrared communication) through which data and signals are transmitted and received to and from the host unit (not shown) and through which power is supplied. The PCB 108 controls the HDA 102 with transmitting and receiving the data and signals and supplying the power through the connector 111, and processes data and signals between the host unit and the HDA 102. The PCB 108 includes besides said connector 111 for connecting with the host unit (not shown), ferrite beads 120 and 122, an interface drive controller 112, a read/write channel 115, a micro-processor 116, and a spindle motor-VCM drive circuit 119. Further, 113 is a buffer memory, 117 is a crystal oscillator, and 118 is a servo gate-array. And, 125 is ground of the host unit, 133 is interface lines to the host unit, 129 is a DC 5V power supply line of the host unit, 126 is ground of the later-mentioned first electric circuit portion in the PCB 108, 127 is ground of the later-mentioned second electric circuit portion in the PCB 108, 128 is ground of the HDA, 120 is a DC 5V power supply line for the later-mentioned second electric circuit portion which is passed through the ferrite beads 120, 130 is a DC 5V power supply line for the later-mentioned first electric circuit portion which is passed through the ferrite beads 122, 131 is a DC 5V power supply line for the later-mentioned second electric circuit portion, 132 is a DC 5V power supply line for the HDA 102, and 138 is a bus line.

The PCB 108 includes the first electric circuit portion 109 and the second electric circuit portion 110 that are substantially electrically separated from each other. While it is sometimes stated herein that 109 and 110 are electrically separated from each other, it should be understood that there may be a negligible electrical connection such as a series circuit of a resistor and an inductor placed between 109 and 110. Such a circuit is shown in the embodiment of FIG. 1 and is discussed further herein. In this case, it should be understood that electrically separated as used herein means substantially electrically separated. Power supply line, ground, data line, and signal line of the first electric circuit portion 109 is substantially separated electrically from the second electric circuit portion 110. In this case, the first electric circuit portion 109 includes the connector 111, the ferrite beads 120 and 122, and the interface drive controller 112 having the buffer memory 113. Power supply line, ground, data line, and signal line of the first electric circuit portion 109 are connected directly to those of the host unit (not separated from each other). Here the second electric circuit portion 110 includes the read/write channel 115, the microprocessor 116 having the crystal oscillator 117, the servo gate array 118, and spindlemotor-VCM drive circuit 119. Power supply line, ground, data line, and signal line of the second electric circuit portion 110 are electrically common with those of the HDA 102 (read/write preamplifier 107) (not separated from each other). Namely, the HDA 102 (amplifier 107) is separated electrically from the first electric circuit portion 109 and, in this sense, the HDA 102 (amplifier 107) is considered to be included in the second electric circuit portion 110.

Thus, the first electric circuit portion 109 is separated electrically from the second electric circuit portion 110, and data and signals can be transmitted and received between the first electric circuit portion 109 and the second electric circuit portion 110 by an optical coupling means etc., here a data-signal photocoupler 114. With the first electric circuit portion 109 being separated electrically from the second electric circuit portion 110, in order to transmit and receive data and signals between both portions, light, sound waves, and electromagnetic waves can be used as a transmitting media. However, sound waves and electromagnetic waves are not practical because of the difficulty in configuration and acoustic and electromagnetic influence to circumference, so optical coupling such as optical communication with infrared ray, for an example said data-signal photocoupler 114, is best suited.

Furthermore, the DC 5V power can be supplied from the first electric circuit portion 109 to the second electric circuit portion 110 also by optical coupling means, and power photo-transmitter 121 is employed here. Such power supplying from the first electric circuit portion 109 to the second electric circuit portion 110 when power supply line and ground are separated electrically between both portions, can be performed with electromagnetic inductive coupling such as a generator or an insulating transformer, or by DC to DC converter besides with photo coupling such as said power phototransmitter 121. And, the second electric circuit portion 110 can be configured as having a power source independent from the first electric circuit portion such as a battery.

A series circuit of a inductance 142 and a resistor 143 is inserted between the ground 126 of the first electric circuit portion 109 and the ground 127 of the second electric circuit portion 110. This series circuit is the only electrical connection between the first and second electric circuit portion 109 and 110. Hence, circuit portions 109 and 110 are said to be substantially electrically separated. In this case, the inductance 142 and the resistor 143 may have equivalents, and these actual parts are not always necessarily inserted.

Further, the disk drive enclosure 101 contains sheet, mesh, or powder form of conductive material so that the device is shielded from EMI (Electro-Magnetic Interference), and the conductive material is connected electrically to the ground of the host unit, chassis ground 124 here, by an exclusive ground connector 123. The connector 123 may be a pin, brush, or other form but it is required that increase of high frequency impedance by skin effect is small to keep enough shielding effect from radiation noise. The brush form connector is shown in FIG. 2.

An electrically insulating means (not shown) having spark voltage durability over 4 kV are provided between the conductive material of the disk drive enclosure 101 and both the first and second electric circuit portion 109 and 110. The insulating means is constructed by inserting an electric insulator for an example (not shown) and maintaining required surface-distance and space-distance along the insulator surface. The minimum surface-distance and minimum-space-distance which is necessary to maintain insulation between circuits, and to keep safety, is determined in the international product safety standard IIEC 950-2.9.2.2 corresponding to the circuit operating voltage and it is possible to design the device based upon this. The over 4 kV spark voltage of said insulating means is determined so as to satisfy the EMC standard for small magnetic disk device.

A switch 144 is provided to each connector pin (input pin) of the connector 111 for connecting with lines 129 and 133. The switch closes or opens between the pins and ground 126 respectively in accordance with disconnecting or connecting of the disk drive enclosure 101 to the host unit.

The operation of the above mentioned device according to the present invention will now be described. In ordinary operation, the interface line 133, the DC 5V power supply line and the ground 125 of the host unit such as PC, are connected to those of the electric circuit (the first electric circuit portion 109) of the device by the present invention through the connector 111. And data, mainly read/write data, and control commands (signals) between the host unit and the first electric circuit portion 109 are transmitted and received and the DC 5V power is supplied from the host unit to the first electric circuit portion 109 through the connector 111. And the host unit and the first electric circuit portion 109 have a common ground 124–126.

The transmitting and receiving of the read/write data and the control commands are executed by an interface-drive controller 112 under control of a microprocessor 116. The microprocessor 116 rotates the disk 103 with an determined rotational speed by controlling the drive current to the spindle-motor 105 trough the spindle-motor VCM drive circuit and moves and positions the head 104 to an appointed track to perform the read/write operation in the HDA 102 following the read/write control commands from the host unit.

The micro processor 116 controls the positioning of the head actuator to a required position under the control of the interface drive controller 112 following the read/write control commands from the host unit. And the controller 112 also controls the read/write operation at the required track and sector at the timing that the head 104 has reached to the required sector on the required track, by controlling the transmitting and receiving of NRZ data 134 to and from the read/write channel 115 and by control of the read write operation by the read/write controller 137.

The read/write channel 115 supplies the micro processor 116 with servo data 139 read from a servo data portion of a data track on the disk 103 and the servo data 139 is used for the head actuator positioning control.

The reproduced very small analog signal from the head 104 with about 0.5 mvpp amplitude, is amplified to about 100 mvpp at the pre-amplifier 107 output, and finally to 500 mvpp to 1 Vpp with total gain of about 60 dB at the post amplifier output, namely at input of a peak detector or at input of A/D converter in PRML detector. Then the amplified signal is transformed into pulse and digitized. The HDA 102 which includes this very small analog signal, namely the second electric circuit portion 110 (the HDA 102 is electrically equivalent to the second electric circuit portion 110, since the HDA 102 has common ground and power supply with the second electric circuit portion 110 and is separated electrically from the first electric circuit portion 109) is shielded by the disk drive enclosure 101 connected with the above mentioned ground 124 through the connector 123, from inductive and capacitive radiation noise from the outside including that caused by electrostatic discharge.

The transmitting/receiving of data and signals between the first electric circuit portion 109 including the interface drive controller 112 and the second electric circuit portion 110 which processes small analog signal, and the power supplying from the first electric circuit portion 109 to the second electric circuit portion 110 are executed by the photo coupling means having different a ground in each side, namely by the data-signal photocoupler 114 and power photo transmitter 121, respectively. Hereby, both electric circuit portions 109 and 110 are substantially separated as electric circuit portions, and the anti-noise durability of the second electric circuit portion 110 to conductive noise from the outside through the interface line 133 to the host unit, DC 5V power supply line 129, and the ground 125, is extremely improved.

Insulating means having spark voltage durability over 4 kV against electrostatic discharge are provided between the conductive material of the disk drive enclosure 101 and both the first and second electric circuit portions 109 and 110. Thus, in the case of electrostatic discharge to the disk drive enclosure 101, electrostatic redischarge from the disk drive enclosure 101 to the first and second electric circuit portions 109 and 110, is prevented and break down of those circuits, data error, and hang-up of device operation are avoided.

The switch 144 which is inserted between each input pin of the connector 111 and the ground, are closed and opened in accordance with disconnecting or connecting of the disk drive enclosure 101 to the host unit. Namely, when the disk drive enclosure 101 is connected to the host unit, each switch 144 is opened, and power can be supplied, and data and signals can be transmitted and received to and from the device. On the other hand, when the disk drive enclosure 101 is not connected to the host unit, each switch 144 is closed and the each input pin of the connector 111 is connected to the ground. Hereby, the breakdown of the circuit inside the device is prevented even when electrostatic discharge occurs at the input pin of the connector 111.

Since the series circuit of the inductance 142 and resistor 143 is inserted between the ground 126 of the first electric circuit portion 109 and the ground of the second electric circuit portion 110, the charge on the second electric circuit portion can be discharged relatively slowly to the first electric circuit portion without adversely affecting device operation. Hereby, excessive charge on the second electric circuit portion 110 is prevented, and harmful affect to the device itself or device operation (circuit breakdown, data error, and hang up of device operation) by discharge to the first electric circuit portion 109 or to others is avoided. Especially, since high frequency component is suppressed by the inductance 142, it is prevented that noise generated in digital circuit of the first electric circuit portion 109 affects the small analog signal (reproduced signal) in the second electric circuit portion 110. Since the HDA 102 is considered to be contained in the second electric circuit portion 110 as mentioned above, noise from the digital circuit in the first electric circuit portion 109 is prevented from affecting the very small analog signal (reproduced signal) from the read/write amplifier 107 in the HDA 102.

Now, how to determine the value of the resistor 143 will be described. Device operating voltage of under about 5 VDC is negligible in considering the electrostatic discharge of several W. The resistive component of the inductance 142 is also negligible because the slow discharge is regarded as direct current. Then, Vs which is relative charged voltage to the second electric circuit portion 110, under the condition that the Vs is less than 4 kV which is spark voltage durability between the first electric circuit portion 109 and the second electric circuit portion 110, is shown by $$Vs = I \cdot R$$

$$I = -d/dt \int Q(t)dt$$

$$|Vs| < 4[kV]$$

where $Q(t)$[coulomb/sec.] is charge generated in the second electric circuit portion 110, $Q(t)dt$[coulomb] is accumulated charge, I is discharge current in the resistor 143 whose value is R.

Then, R is given by $$R < |4[kV]/d/dt \int Q(t)dt|$$

Practically, larger value of R which satisfy the next relation may be chosen so that the charge can be discharged relatively slowly.

$$R < |4[kV]/Max.Q(t)|$$

Here, with the capacity C [Farad] between the first electric circuit portion 109 and the second electric circuit portion 110, the following relation is obtained $$\int Q(t)dt = C \cdot Vs$$

When the capacity C[Farad] between the first electric circuit portion 109 and the second electric circuit portion 110 is measured, and the maximum d/dt Vs is measured by observation of change of the Vs when R=∞, Max.Q(t) is obtained by $$Max.Q(t) = C \cdot Max.d/dt \; Vs$$

In this measurement, the high frequency component related to electrostatic discharge and circuit operation is eliminated.

The device by the present invention as shown in FIG. 1 is a applicable not only to the PCMCIA card type removable magnetic disk.device as shown in FIG. 2 but also to the built-in type disk device for various information processing devices.

While the above mentioned embodiment refereed to magnetic disk devices, it is not restricted to magnetic disk devices only. Since the reproduced signal from a transducer (optical heads) replacing magnetic heads such as MR heads is also very small in optical disk devices. This is similar as the case of a magnetic disk device, therefore, the present invention can be applied to an optical disk device and the same effect as magnetic disk device can be obtained.

As described above, in accordance with the present invention, the electric circuit is separated electrically into two portions, namely the second electric circuit portion which processes small analog signal and the first electric circuit portion which is the electric circuit excluding the second electric circuit portion. The ground of the first electric circuit portion can be connected to the ground of the host unit, and the ground and power supply line of the transducer-disk assembly are connected directly to those of the second electric circuit portion respectively.

Furthermore, the optical data and signals transmitting/receiving means which transmits and receives data and signals between the first electric circuit portion and the second electric circuit portion, is provided between the both portions, the enclosure that encloses and shields electromagnetically the transducer-disk assembly and the electric circuit with electric conductor, is provided, and a conductive connecting means is provided between the electric conductor of the enclosure and the ground of the host unit. Hereby, the device can be realized which maintain superior Electro-Magnetic Compatibility and higher durability to the noise induced by the electrostatic discharge not only in an in-active state but also in an active state of operation, and data error, hang-up of device operation, and circuit breakdown is avoided.

While the present invention has been described above according to a preferred embodiment, one of ordinary skill in the art would be enabled by this disclosure to make various modifications and still be within the scope and spirit of the present invention as recited in the appended claims.

What is claimed is:

1. In a disk drive having a recording medium and a transducer which records and reproduces data to and from the recording medium, an electric circuit comprising:

a first electric circuit including an interface through which power and data signals are supplied from a host unit; and a second electric circuit being substantially electrically separated from and coupled to the first electric circuit by a photo coupler and through the second electric circuit an analog signal of small magnitude is transmitted to and from the transducer.

2. The electric circuit according to claim 1, further comprising a series circuit connected between the first and second circuit with an inductance and a resistance to permit discharging of a charge occurring on the second electric circuit.

3. The electric circuit according to claim 1, wherein a ground of the first electric circuit is connected to a ground of the host unit via the interface, and wherein a ground and power supply of the second electric circuit is commonly connected to an amplifier which amplifies signals received from the transducer.

4. The electric circuit according to claim 2, wherein a ground of the first electric circuit is connected to a ground of the host unit via the interface, and wherein a ground and power supply of the second electric circuit is commonly connected to an amplifier which amplifies signals received from the transducer.

5. A removable disk drive unit comprising:

a first electric circuit having an interface for communicating with a host computer;

a second electric circuit having a read-write channel optically coupled to the first electric circuit; and a head-disk assembly including an amplifier connected to the second electric circuit, the head-disk assembly having a common ground and a common power supply with the second electric circuit, wherein the first electric circuit is not wired physically to the second electric circuit but is optically coupled to the second electric circuit and the head-disk assembly to thereby prevent noise present in the first electric circuit from affecting signals of small magnitude that are present in the second electric circuit.

6. The removable disk drive unit according to claim 5, further comprising an enclosure which surrounds and electromagnetically shields the first and second electric circuits and the head-disk assembly.

7. The removable disk drive unit according to claim 5, wherein a ground of the first electric circuit is connected to a ground of the host computer via the interface.

8. The removable disk drive unit according to claim 6, wherein a ground of the first electric circuit is connected to a ground of the host computer via the interface.

9. A device comprising a transducer-disk assembly;

an electric circuit which controls the transducer disk assembly;

an enclosure electromagnetically shielding the transducer disk assembly and the electric circuit;

wherein the electric circuit is separated into a first electric circuit portion and a second electric circuit portion, the second electric circuit portion transmitting a small signal relative to the first electric circuit portion, and wherein between first and second electric circuits, there is no hard-wired line for communication with data but there is a coupler for communicating with one another optically.

10. The device according to claim 9, wherein the first electric circuit portion is provided with an interface through which communication with a host is accomplished.

11. The device according to claim 10, wherein the first electric circuit portion is connected to the ground and power supply lines of the host via the interface.

* * * * *